(12) United States Patent
Ueki (10) Patent No.: US 12,406,190 B2
(45) Date of Patent: Sep. 2, 2025

(54) FAILURE PROBABILITY EVALUATION SYSTEM AND METHOD

(71) Applicant: Hitachi, Ltd., Tokyo (JP)

(72) Inventor: Yosuke Ueki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 760 days.

(21) Appl. No.: 16/975,154

(22) PCT Filed: Jan. 24, 2019

(86) PCT No.: PCT/JP2019/002230
§ 371 (c)(1),
(2) Date: Aug. 24, 2020

(87) PCT Pub. No.: WO2019/176315
PCT Pub. Date: Sep. 19, 2019

(65) Prior Publication Data
US 2021/0089928 A1    Mar. 25, 2021

(30) Foreign Application Priority Data
Mar. 16, 2018  (JP) ................. 2018-049016

(51) Int. Cl.
*G06N 3/126* (2023.01)
*G06F 16/2458* (2019.01)
*G06N 7/01* (2023.01)

(52) U.S. Cl.
CPC ......... *G06N 3/126* (2013.01); *G06F 16/2477* (2019.01); *G06N 7/01* (2023.01)

(58) Field of Classification Search
CPC ...... G06N 3/126; G06N 7/01; G06F 16/2477; G01M 99/00; G06Q 10/00; G06Q 10/04
See application file for complete search history.

(56) References Cited

U.S. PATENT DOCUMENTS

| | | | |
|---|---|---|---|
| 2004/0107067 A1* | 6/2004 | Ishii .................. | G05B 23/0283 702/136 |
| 2010/0138267 A1* | 6/2010 | Vittal .................. | F03D 17/00 702/34 |

(Continued)

FOREIGN PATENT DOCUMENTS

| | | | | |
|---|---|---|---|---|
| EP | 2224256 A1 * | 9/2010 | ......... | G06F 17/5009 |
| JP | 2002108440 A * | 4/2002 | | |

(Continued)

OTHER PUBLICATIONS

ReliaSoft Life Data Analysis Reference, generated on May 22, 2015 (retrieved from https://www.reliawiki.com/index.php/Life_Data_Analysis_Reference_Book), 438 pages (Year: 2015).*

(Continued)

*Primary Examiner* — Markus A. Vasquez
(74) *Attorney, Agent, or Firm* — MATTINGLY & MALUR, PC (57) ABSTRACT

The remaining life of a component of a mechanical system is predicted with high accuracy. A failure probability evaluation system evaluates a failure of a component of each mechanical system for a mechanical system group including a plurality of mechanical systems, and includes a failure history database for accumulating past failure history data about the mechanical system. A time-series operation database stores time-series physical quantity data representing an operating state of the mechanical system. A failure rate function identification unit calculates a failure rate function of a mechanical system by statistical processing based on the failure history data, and a damage model generation/update unit having a function of generating an explanatory variable expression of a failure rate function which minimizes a variation in life is defined by the failure rate function using the time-series physical quantity data.

17 Claims, 8 Drawing Sheets

(56) References Cited

U.S. PATENT DOCUMENTS

| | | | | |
|---|---|---|---|---|
| 2011/0054806 | A1* | 3/2011 | Goldfine | G07C 3/00 |
| | | | | 702/34 |
| 2012/0041716 | A1* | 2/2012 | Higginbotham | G06Q 10/06 |
| | | | | 702/184 |
| 2013/0063262 | A1* | 3/2013 | Shaikh | G05B 23/0272 |
| | | | | 340/540 |
| 2014/0324495 | A1* | 10/2014 | Zhou | F03D 80/50 |
| | | | | 705/7.13 |
| 2019/0204182 | A1* | 7/2019 | Yamashita | F16C 19/52 |
| 2020/0141392 | A1* | 5/2020 | Damgaard | F03D 17/00 |

FOREIGN PATENT DOCUMENTS

| | | | | |
|---|---|---|---|---|
| JP | 2007-107446 | A | | 4/2007 |
| JP | 2009-217718 | A | | 9/2009 |
| WO | WO-2012157040 | A1 * | 11/2012 | ............ G06Q 10/08 |
| WO | WO-2016186646 | A1 * | 11/2016 | ............ E21B 41/00 |
| WO | 2017/163561 | A1 | | 9/2017 |
| WO | 2017/203868 | A1 | | 11/2017 |

OTHER PUBLICATIONS

Kostandyan et al., Reliability of Wind Turbine Components—Solder Elements Fatigue Failure, 2012 Proceedings Annual Reliability and Maintainability Symposium, Jan. 23-26, 2012, 7 pages (Year: 2012).*

Thomas, Gina, Weibull Parameter Estimation Using Genetic Algorithms and a Heuristic Approach to Cut-Set Analysis, Master of Science Thesis, Mar. 1995, 99 pages (Year: 1995).*

Tian et al., Condition based maintenance optimization for wind power generation systems under continuous monitoring, Renewable Energy 36 (2011):1502-1509, available online Dec. 3, 2010, pp. 1502-1509 (Year: 2010).*

Nilsson, Julia, Maintenance management of wind power systems, Master Thesis, School of Electrical Engineering, Royal Institute of Technology KTH 2006, 68 pages (Year: 2006).*

Yasuyoshi Fukui, "Introduction to Reliability Engineering," Morikita Publishing Co., Ltd., 2006.

International Search Report of PCT/JP2019/002230 dated May 7, 2019.

* cited by examiner

FIG. 2

| FAILURE OCCURRENCE DATE AND TIME | | SITE NAME | UNIT | COMPONENT NAME | EVENT |
|---|---|---|---|---|---|
| 2016/1/3 | 9:32 | ○○ | UNIT 4 | SCREW | LOOSENESS |
| 2016/5/15 | 4:21 | △△ | UNIT 11 | SCREW | DEFECT |
| 2016/12/20 | 17:53 | ×× | UNIT 2 | BLADE | LOOSENESS |
| 2017/3/20 | 1:03 | □□ | UNIT 3 | CURVED PIPE | VIBRATION |
| 2017/3/29 | 13:21 | ○○ | UNIT 7 | SCREW | BROKEN |
| 2017/10/4 | 13:21 | ×× | UNIT 7 | BLADE | DEFECT |
| ⋮ | ⋮ | ⋮ | ⋮ | ⋮ | ⋮ |
| 2018/1/3 | 22:39 | □□ | UNIT 4 | SCREW | LOOSENESS |

| NUMBER OF OPERATION DAYS UNTIL FAILURE OCCURRENCE |
| --- |
| 70 |
| 90 |
| 152 |
| 352 |
| 723 |
| 752 |
| : |
| 3521 |

| NUMBER OF CONTINUOUS OPERATION DAYS UNTIL NOW |
| --- |
| 5 |
| 7 |
| 30 |
| 32 |
| 175 |
| 223 |
| : |
| 7219 |

FIG. 5

| NUMBER OF DAYS | SITUATION |
| --- | --- |
| 5 | OPERATION |
| 7 | OPERATION |
| 30 | OPERATION |
| 32 | OPERATION |
| 70 | FAILURE |
| 90 | FAILURE |
| 152 | FAILURE |
| 175 | OPERATION |
| 223 | OPERATION |
| 352 | FAILURE |
| 723 | FAILURE |
| 752 | FAILURE |
| ⋮ | ⋮ |
| 3521 | FAILURE |
| ⋮ | ⋮ |
| 7219 | OPERATION |

| NUMBER OF DAYS | NUMBER OF CORRECTION DAYS (D3) | SITUATION |
| --- | --- | --- |
| 5 | 10 | OPERATION |
| 7 | 15 | OPERATION |
| 30 | 60 | OPERATION |
| 32 | 32 | OPERATION |
| 70 | 100 | FAILURE |
| 90 | 150 | FAILURE — 22 |
| 152 | 300 | FAILURE |
| 175 | 100 | OPERATION |
| 223 | 200 | OPERATION — 23 |
| 352 | 500 | FAILURE |
| 723 | 1000 | FAILURE |
| 752 | 820 | FAILURE |
| ⋮ | ⋮ | ⋮ |
| 3521 | 4000 | FAILURE |
| ⋮ | ⋮ | ⋮ |
| 7219 | 8000 | OPERATION |

FAILURE PROBABILITY EVALUATION SYSTEM AND METHOD

TECHNICAL FIELD

The invention relates to a system and a method for evaluating a failure probability of a component forming each mechanical system for a mechanical system group including a plurality of mechanical systems.

BACKGROUND ART

In mechanical systems such as power generation equipment and transportation equipment, in order to enable the system to properly perform predetermined functions, it is necessary to properly grasp and manage the service life of each component and to perform maintenance such as repair and replacement of each component appropriately at a proper timing. In particular, when managing and operating a plurality of same-type machines, statistically analyzing failure records that occurred in the past makes it possible to predict the number of failure events that will occur in the future. Here, the failure record refers to data in which the content of the failure event and the time of occurrence are recorded as a pair.

As a technique for calculating the failure rate that expresses the number of failures per unit time and the failure probability obtained by integrating it by statistical analysis in connection with constructing a system that evaluates the failure probability, NPL 1 is known for example.

Further, it is known from PTL 1 that, for example, in the case of a rotary mechanical element such as a bearing, a cumulative load amount leading to a failure of the bearing can be expressed based on a rotation speed and a load.

CITATION LIST

Patent Literature

PTL 1: WO 2017/203868

Non-Patent Literature

NPL 1: Yasuyoshi Fukui, "Introduction to Reliability Engineering," Morikita Publishing Co., Ltd., 2006

SUMMARY OF INVENTION

Technical Problem

NPL 1 assumes that the operating statuses of the mechanical systems are almost the same, but the operating statuses of most mechanical systems are not constant. For example, the operating status of the wind power generator changes momentarily according to the wind conditions, and the load also varies depending on the location conditions. Further, in construction machines and the like, the load on the equipment changes depending on the work items that differ daily and the driving characteristics of a driver. Therefore, in the simple evaluation of the failure rate per unit time and the failure probability, there is a limit to the accuracy of estimating the number of failures and the remaining life obtained from the evaluation.

Fortunately, in recent years various sensors have been attached to mechanical systems, making it easy to access the measurement data from these sensors via a network. Therefore, it is possible to more accurately estimate the number of failures and the remaining life by evaluating the operation status that differs for each individual from such measurement data and appropriately considering the evaluation.

Further, according to PTL 1, if the cumulative load amount is calculated from the sensor data up to the time when the failure event occurs, more accurate prediction of the number of failures and the remaining life is possible based on the cumulative load amount of the bearing different for each individual.

As described above, in constructing the system for evaluating the failure probability, it is possible to more accurately estimate the number of failures and the remaining life by using not only the failure record but also the sensor data.

However, mechanical systems are composed of various types of components. For this reason, it is not easy to clarify the failure mechanism of all components based on physical laws and to define the load factors that cause the components to fail.

Therefore, there is a need of a technology that can utilize sensor data to estimate the number of failures and the remaining life and automatically search for an appropriate load factor.

Solution to Problem

In order to solve the above-mentioned problem, in the invention, "a failure probability evaluation system, which evaluates a failure of a component of each mechanical system in a mechanical system group including a plurality of mechanical systems, includes a failure history database for accumulating past failure history data about the mechanical system, a time-series operation database for storing time-series physical quantity data representing an operating state of the mechanical system, a failure rate function identification unit that calculates a failure rate function of a mechanical system by statistical processing based on the failure history data, and a damage model generation/update unit having a function of generating an explanatory variable expression of a failure rate function which minimizes a variation in life defined by the failure rate function using the time-series physical quantity data. The failure rate function identification unit provides a failure rate function which minimizes a variation in life."

The invention also relates to a "failure probability evaluation method, which evaluates a failure of a component of each mechanical system for a mechanical system group including a plurality of mechanical systems, includes calculating a failure rate function of the mechanical system by statistical processing based on past failure history data for the mechanical system, generating an explanatory variable expression of a failure rate function that minimizes a variation in life defined by the failure rate function using time-series physical quantity data representing an operating state of the mechanical system, and obtaining a failure rate function that minimizes a variation in life."

Advantageous Effects of Invention

The invention identifies a failure rate function based on failure data in the same manner as the known technology, but can estimate a number of failures and a lifespan with higher accurate by providing an automatic generation function of a damage model in consideration of time-series operation data.

DESCRIPTION OF EMBODIMENTS

Hereinafter, embodiments of the invention will be described using the drawings.

In the following, embodiments of the invention will be described by taking as an example a failure probability evaluation system and method for components of a wind power generator. Here, although a plurality of wind power generators are targeted, the installation place is not limited, and each wind power generator may be installed in a different wind power plant (wind farm).

First Embodiment

Figure 1:
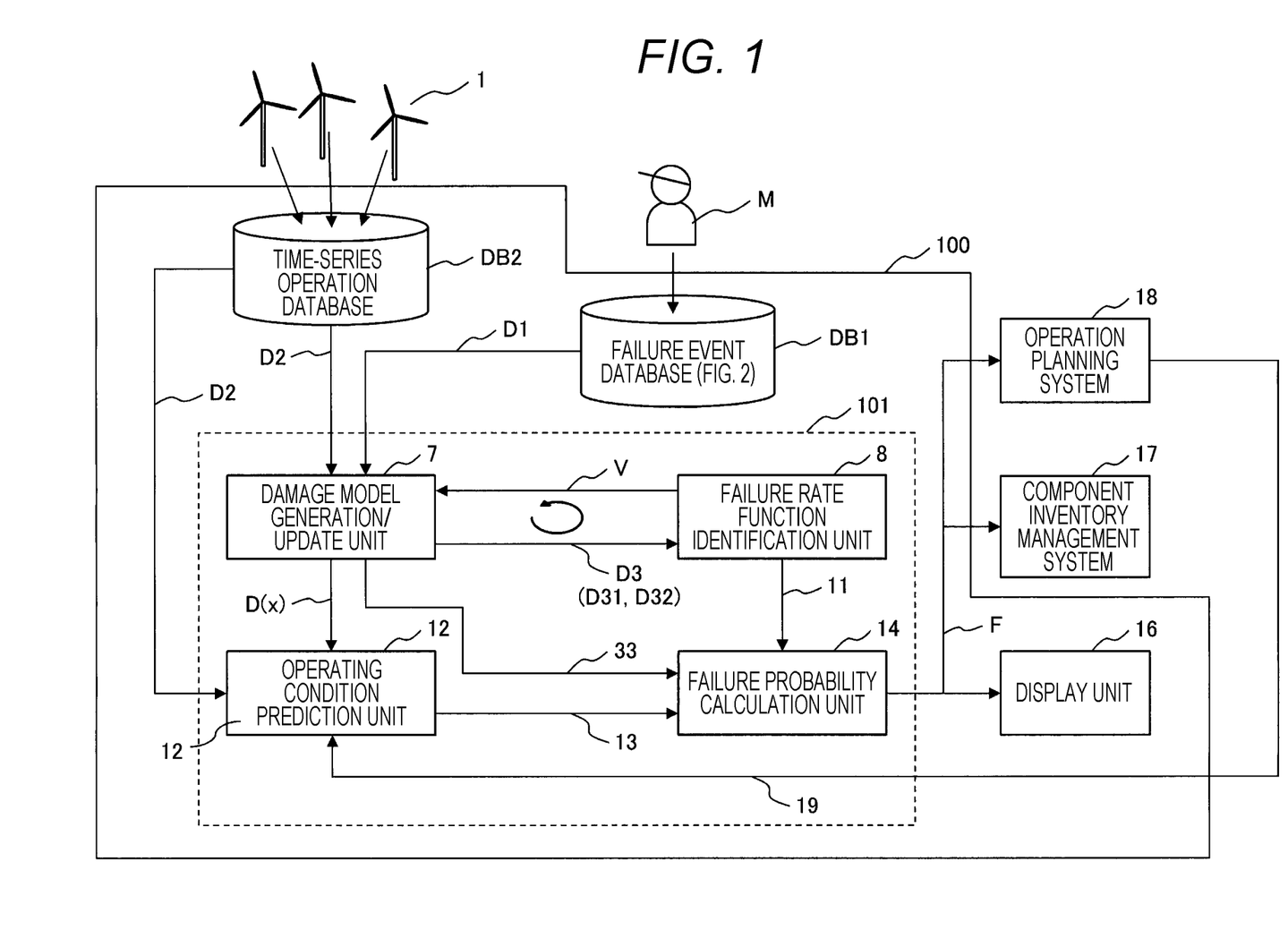
FIG. 1 is a diagram illustrating an example of a failure probability evaluation system configured for a plurality of wind power generators.

FIG. 1 illustrates a failure probability evaluation system configured for a plurality of wind power generators.

A failure probability evaluation system 100 of FIG. 1 is configured by a computer, and is configured by a plurality of databases DB (DB1, DB2), a calculation unit 101, and a display unit 16. Further, the failure probability evaluation system 100 is given data from a plurality of wind power generators 1 or data input by a worker M who is in charge of maintenance, and the output of the failure probability evaluation system 100 is supplied to the outside by the display unit 16. In addition, the output of the failure probability evaluation system 100 can be given to the operation planning system 18 of a plurality of wind power generators and a component inventory management system, and utilized.

Of the plurality of databases DB, first, failure events of the wind power generators 1 are accumulated in failure event data DB1.

Here, the failure event is an event related to the failure such as "failure", "abnormality", and "component replacement". If the target wind power generator 1 is equipped with a system for automatically detecting failure events, a method may be adopted in which the failure event automatic detection system and the failure event database DB1 are connected via a network to automatically accumulate data. Alternatively, a method may be adopted in which the worker M in charge of maintenance judges a failure event and registers the content thereof. With this configuration, failure events that have occurred in the past in the plurality of wind power generators 1 are accumulated in the failure event database DB1.

Figure 2:
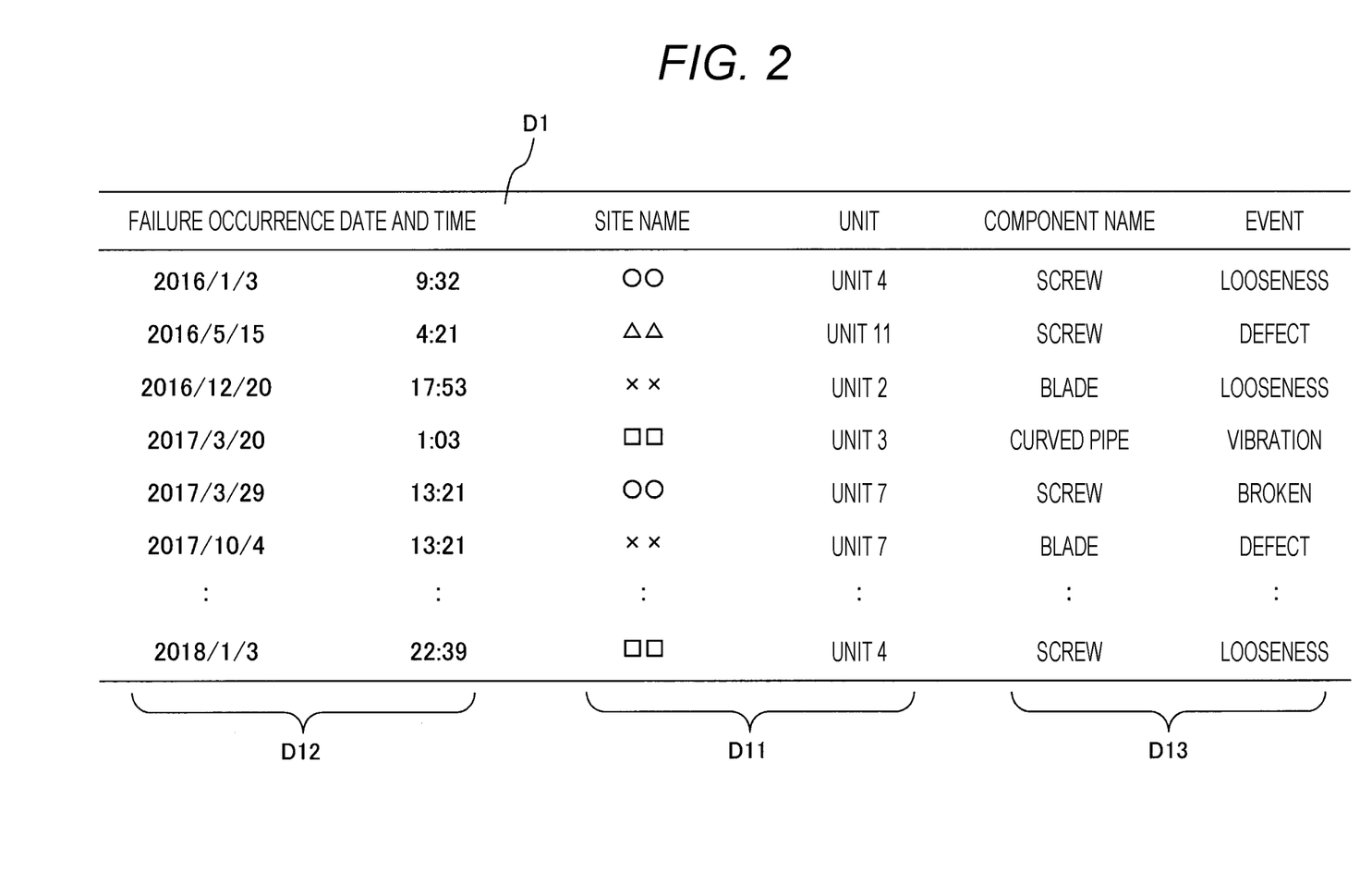
FIG. 2 is a diagram illustrating a configuration example of a failure event database DB1.

FIG. 2 is a diagram illustrating a configuration example of the failure event database DB1. The failure event data D1 accumulated in the failure event database DB1 is data D11 (defined by the name of the site to which the wind power generator belongs and its unit number in FIG. 2) of the individual in which the failure has occurred as illustrated in FIG. 2, and the failure occurrence time data D12. The failure event data D1 may further include a failure content D13 (defined by a failure occurrence component name, a location, and an occurrence event thereof in FIG. 2).

In the plurality of databases DB, a time-series operation database DB2 stores time-series operation data D2.

The large-scale wind power generator 1 is usually equipped with a data collection system that collects wind condition data such as wind speed and wind direction, and operation data such as power generation amount and rotor rotation speed. In the invention, each piece of data is stored as the time-series operation data D2 in the time-series operation database DB2 via a communication system such as a network. At this time, the collection interval of each data is not particularly limited, but in the invention, since the number of failures and the remaining life are estimated in a relatively long period, an interval of about one day is ideal.

The time-series operation data D2 is preferably a statistical value such as a maximum value, a minimum value, an average value, or a standard deviation within the collection interval, rather than a measurement value sampled at an arbitrary interval. This makes it possible to maximize the use of information while significantly reducing the amount of data. Further, there may be a method for storing not only a statistical value such as a simple average value, but also the degree of fatigue damage as time-series data as a result of fatigue damage analysis based on the linear cumulative damage rule. Here, the degree of fatigue damage is a statistic obtained by performing rainflow count processing or the like on the measured waveform. For example, if a sensor such as a strain sensor or a load cell for acquiring load information is attached to the target and it is clear that a failure is caused by accumulated fatigue damage, it is particularly effective to adopt the degree of fatigue damage as one of the time-series operation data.

In this way, it is desirable that the data collection system on the wind power generator 1 side or the time-series operation database DB2 on the failure probability evaluation system 100 side has a function of performing preprocessing such as statistical processing and degree of fatigue damage analysis processing on measured values. The information accumulated in the time-series operation database DB2 is not limited to the information obtained from the wind power generator 1 itself. For example, meteorological data measured by a meteorological observation facility provided near the wind power generator 1 is also useful for evaluating the operating state of the wind power generator 1.

The failure event data D1 and the time-series operation data D2 accumulated in the databases DB1 and DB2 are processed by the calculation unit 101, and a failure probability F is finally obtained.

The calculation unit 101 for deriving the failure probability F is mainly configured by a damage model generation/update unit 7, a failure rate function identification unit 8, an operating condition prediction unit 12, and a failure probability calculation unit 14.

Regarding the calculation unit 101, the failure rate function identification unit 8 will be described first. In order to simplify the description, identification of the failure rate function using only the failure event data D1 will be described here without using the time-series operation data D2. That is, in FIG. 1, it is assumed a condition that the time-series operation data D2 is not input to the damage model generation/update unit 7.

In the case of this assumed case, first, the failure event data D1 stored in the failure event database DB1 is shaped into survival analysis data D3 for analysis in the damage model generation/update unit 7 and provided to the failure rate function identification unit 8. Here, the survival analysis data D3 is data including failure time data D31 and survival time data D32.

Figure 3:
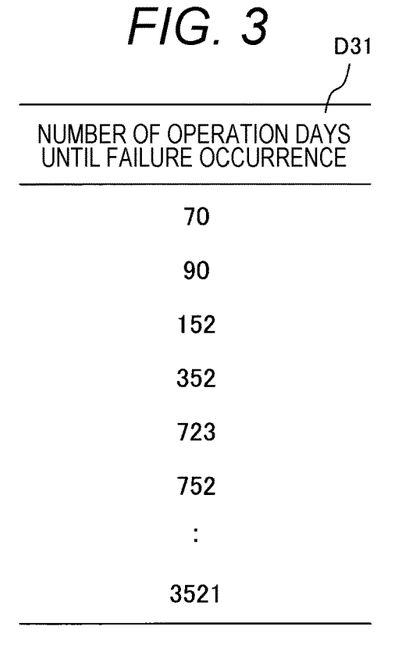
FIG. 3 is a diagram illustrating an example of failure time data D31.

FIG. 3 is an example illustrating the failure time data D31, and the failure time here means an operating time until the failure occurs. The operating time D31 until the occurrence of a failure is obtained from the failure event data D1. The failure event data D1 is data in which a failure event (the data D11 of the individual in which the failure has occurred) and the occurrence time D12 are paired as illustrated in FIG. 2. What is necessary for identification of the subsequent failure rate function is the operating time (hereinafter, simply referred to as failure time) until a failure occurs. Further, the failure time is the time from the occurrence of the previous failure event (time between failure events) or the time from the start of system operation to the occurrence of the current failure event, and is the time including both times.

Since the time D12 at which the previous failure event occurred is recorded in the failure event data D1 in FIG. 2, the failure time can be calculated from the difference between the previous and current occurrence times. If the current failure event is the first failure event, the failure time can be calculated from the difference between the system operation start time and the current failure occurrence time. A failure time calculation process is performed by the damage model generation/update unit 7, and the data is shaped into a format like the aggregated failure data D31 illustrated in FIG. 3. FIG. 3 is a diagram illustrating an example of the calculated failure time, for example, the failure time D31 is obtained from the data of 200 wind power generators 1.

Figure 4:
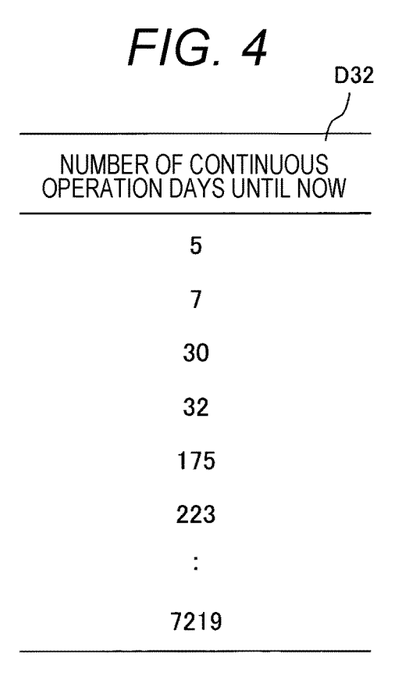
FIG. 4 is a diagram illustrating an example of survival time data D32.

FIG. 4 is an example illustrating the survival time data D32, and the failure time here is the continuous operating time up to the present time. The damage model generation/update unit 7 generates the aggregate failure data D31 and, at the same time, aggregates the time from the present time to the occurrence of the previous failure event or the time to the system operation start time to shape as the aggregate survival data D32 as illustrated in FIG. 4.

The reason why the damage model generation/update unit 7 generates the survival analysis data D3 as the data including the failure time data D31 and the survival time data D32 is as follows.

In the failure rate function identification unit 8, it is necessary to reflect, in order to identify a more likely failure rate function, not only the failure event (the failure time data D31 in FIG. 3) but also the fact that a component is in a healthy state after a certain period of continuous operation (survival time data D32 in FIG. 4).

Normally, even if a failure event occurs once, a healthy state is restored in a shortest time by replacing or repairing components, and the system is restarted. Therefore, considering that the failure rate function identification is performed at a certain time, most of the target components of the individual at that time continues its operating until the present time after the previous failure event occurred or the system started operating. In order to reflect this fact, the damage model generation/update unit 7 finally adds the failure flag 22 to the aggregate failure data D31 and a survival flag 23 to the aggregate survival data D32, and then integrates these to generate the survival analysis data D3.

Figure 5:
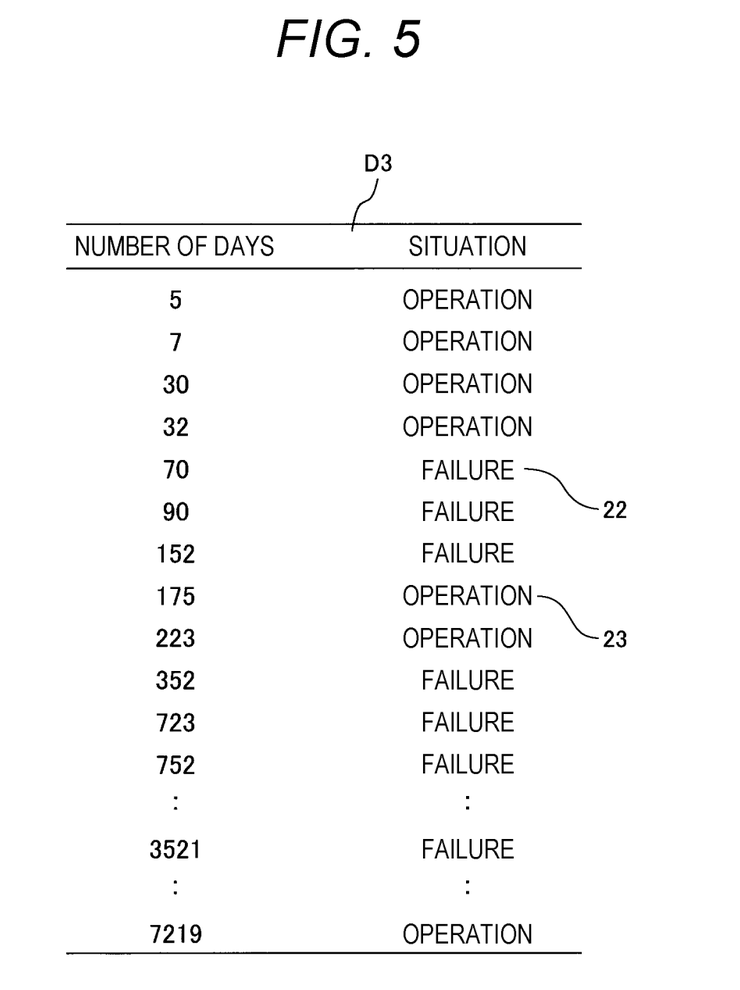
FIG. 5 is a diagram illustrating an example of survival analysis data D3 provided by a damage model generation/update unit 7.

FIG. 5 illustrates an example of the survival analysis data D3 provided by the damage model generation/update unit 7. According to this, it is understood that the survival analysis data D3 is composed of the failure time data D31 with the failure flag 22 and the survival time data D32 with the survival flag 23.

The failure rate function identification unit 8 in FIG. 1 identifies the failure rate function by applying a certain probability distribution function to the survival analysis data D3 based on a statistical method. Further, here, for the sake of simplicity in the explanation, it is assumed that the time-series operation data D2 is not considered, so it is assumed that the damage that causes the target to fail is simply represented by the accumulated operating time.

The method of identifying the failure rate function from the data including the failure data D31 and the survival data D32 (censored data) such as the survival analysis data D3 in the operating time is called a survival analysis of which the specific methods are known. In the invention, since a variation V of the failure rate function 11 is used as an objective function in the damage model update processing described later, the failure rate function 11 needs continuity, but the detailed method is not limited. However, in practice, it is desirable to use the maximum likelihood estimation method (MLE) from the viewpoint of calculation cost. The maximum likelihood estimation method MLE is a method in which an arbitrary probability density function is assumed for the failure rate function p(t) and the parameter of the probability density function is obtained parametrically by optimization calculation.

Specifically, the parameter of the failure rate function is searched for the assumed failure rate function 11 and the survival analysis data D3 so as to maximize a log-likelihood sum L defined by Expression (1).

[Math. 1]

$$L = \Sigma_{i=1}^{n} \log(p(t_i)) + \Sigma_{j=1}^{m} \log(\int_{t_j}^{\infty} p(t)dx) \quad (1)$$

In Expression (1), i and j are the numbers of the failure data D31 and the survival data D32 respectively, and p(x) is a failure rate function. That is, the first term on the right side of Expression (1) represents the likelihood of the failure data D31, and the second term represents the likelihood of the survival data D32.

In the invention, the optimization algorithm employed in the maximum likelihood estimation method MLE is not particularly limited, but the objective function to be handled is differentiable, and the number of variables (parameters) is at most about 2 or 3. Therefore, if an algorithm that uses the derivative of the objective function, such as the quasi-Newton method, is adopted, the optimal solution can be obtained at a relatively low calculation cost. In particular, in the invention, the damage model generation/update unit 7 described later repeatedly calls the failure rate function identification unit 8 to update the damage model. That is, since the maximum likelihood estimation method MLE itself is included in the objective function calculation of the optimization problem, it is extremely important to speed up the maximum likelihood estimation method MLE.

The probability density function may be, for example, a Weibull distribution, a gamma distribution, a lognormal distribution, or the like. The invention is not limited to any probability density function, and the function may be selected based on the experience of the user. Alternatively, a method may be adopted in which a plurality of types of probability density functions are assumed, the maximum likelihood estimation method MLE is performed for each function, and a probability density function with the largest likelihood and a good fit is adopted. The maximum likelihood estimation method MLE defines the probability density function (the failure rate function 11) that best fits the survival analysis data 10. However, since the failure rate function 11 is defined here as the number of failures per unit time (unit damage), the failure probability function 21 is obtained by integrating the number over time. A method of identifying a failure rate function and a failure probability function by the maximum likelihood estimation method MLE with the time as a variable is known.

Figure 6:
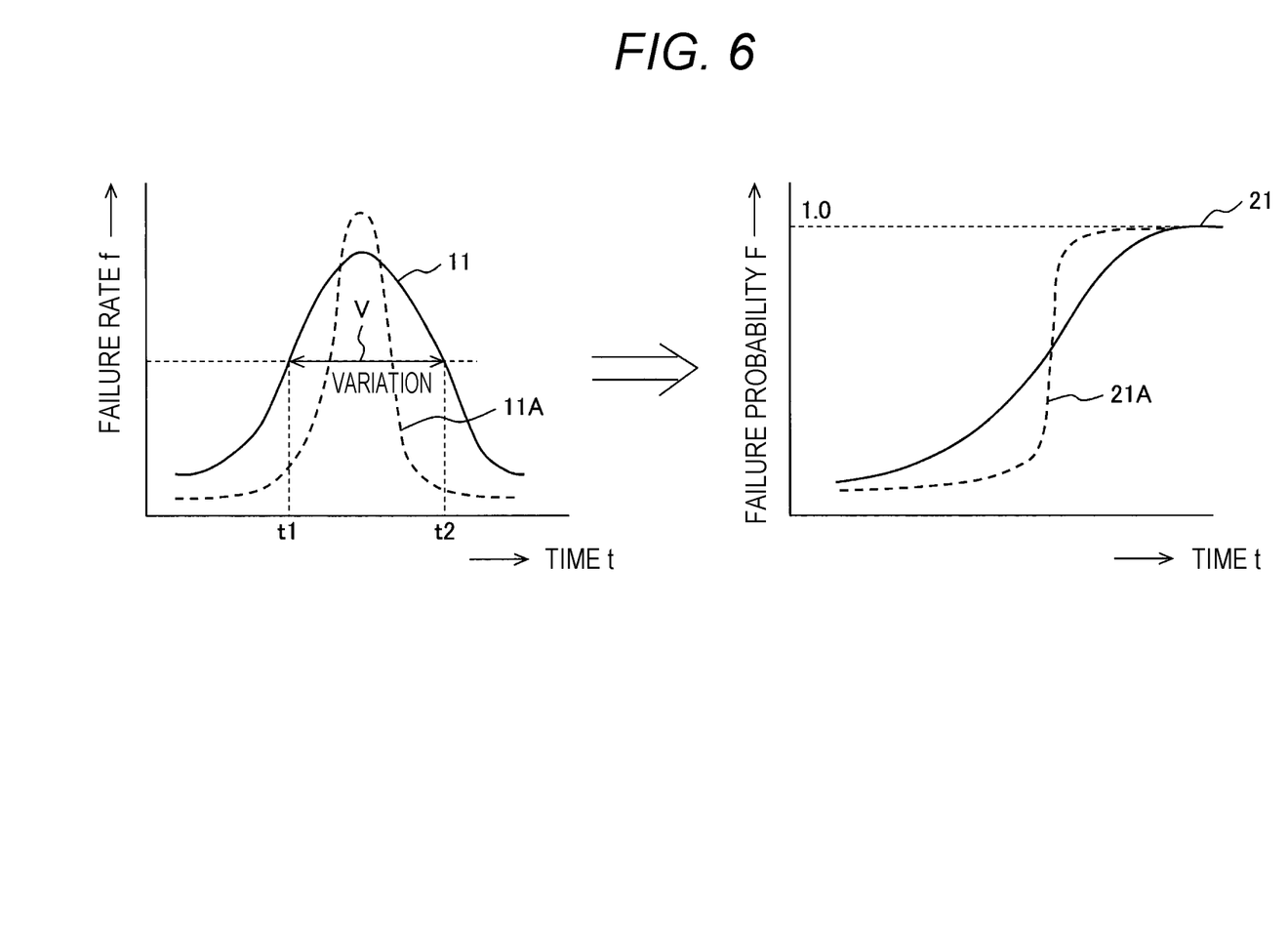
FIG. 6 is a diagram illustrating a relationship between a failure rate f (failure rate function 11) and a failure probability F (failure probability function 21).

FIG. 6 is a diagram illustrating a relationship between a failure rate f (failure rate function 11) and a failure probability F (failure probability function 21). The failure rate f (failure rate function 11) is illustrated on the left of FIG. 6, and the failure probability F (failure probability function 21) is illustrated on the right. The failure rate function 11 obtained by the failure rate function identification unit 8 is represented by time on the horizontal axis and the failure rate f on the vertical axis, and is normally distributed, for example. According to this drawing, the times having a predetermined probability f exist at times t1 and t2, and this period is the variation V of the failure rate function 11. The failure probability F (failure probability function 21) is illustrated by the time on the horizontal axis and the failure probability F on the vertical axis, which is the time integration of the failure rate f (failure rate function 11), and finally the failure probability function 21 is a value in the range of 0 to 1.0, reaching 1.0.

In FIG. 6, a large variation V means that there is a width of failure occurrence prediction times. To minimize the prediction time width and estimate the next failure occurrence date and time within a short time width, it is necessary to reduce the variation V. In FIG. 6, if the failure rate function 11A indicated by the dotted line with a small variation V is obtained, a failure probability function 21A having a steep rise will be obtained.

In the invention, the failure rate function 11A indicated by the dotted line with a small variation V is realized, and the failure probability function 21A having a steep rise is intended to be obtained. A method for realizing this will be described in detail below.

First, the update of a damage model D(x) in the damage model generation/update unit 7 will be described. Since the failure rate function 11 is obtained by the above failure rate function identification, the variation V of the failure rate function 11 can be easily defined according to the definition of the identified probability density function. The damage model generation/update unit 7 automatically searches for a damage model considering the time-series operation data D2 that minimizes the variation V of the failure rate function 11, and reflects the damage model to the survival analysis data D3.

That is, the objective function returns to the optimization problem in which the objective function is the variation V, and the variable is a damage model. Here, it is desirable to use a variation coefficient obtained by dividing the standard deviation of the failure rate function 11 by the average value for the variation V as the objective function. This is because the definition of variation using standard deviation or variance does not allow uniform evaluation of variation for different variables (damage models). Next, the cumulative damage model is a model in which a cumulative damage that causes the target to fail is represented as a function of the time-series operation data D2, and is represented by Expression (2).

[Math. 2]

$$D(x) = \Sigma_{i=0}^{\Delta t} d(x_t) \quad (2)$$

Here, d(x) is a damage model per unit time, and $x_t$ is an operation data vector representing a t-th time-series operation data set. The invention is directed to the wear failure among the initial failure, the accidental failure, and the wear failure. Therefore, since the phenomenon that causes failure due to damage accumulation is handled, the time integral of d(x) is defined as the cumulative damage model D(x).

The case where the time-series operation data D2 is not considered is equivalent to x=[1], and the cumulative damage at the time when an arbitrary operating time step Δt has elapsed is D(x)=Δt. In the invention, the shape of the expression of the damage model is not particularly limited. For example, the damage is expressed in a simplest form of a linear combination of the time-series operation data D2 as Expression (3), and the optimization calculation is relatively low calculation cost.

[Math. 3]

$$d(x) = C^T \cdot x \quad (3)$$

Here, C is a coefficient vector representing weighting of each time-series operation data D2.

Alternatively, when a failure mechanism is known to some extent, a method may be adopted in which the user predefines only the shape of the equation based on the failure mechanism and searches for the coefficient. For example, it is empirically known that the temperature dependence of material deterioration can be expressed by the Arrhenius equation illustrated in Expression (4).

[Math. 4]

$$k = Ae \times p\left(-\frac{E_a}{RT}\right) \quad (4)$$

Here, k represents a rate of the deterioration reaction, and thus the value obtained by integrating the rate over time can be considered equivalent to the accumulated damage. Therefore, when the heat load is dominant as the deterioration factor of the target, the temperature data obtained as time-series operation data 5 can be effectively considered by incorporating the Arrhenius equation represented by Expression (4) into the damage model of Expression (2).

In either method, the number of variables at this time is the number of undetermined coefficients in the damage model itself, which becomes a relatively large-scale optimization problem. In addition, since the objective function may be non-convex, it is desirable to use a genetic algorithm or meta-heuristics such as particle swarm optimization.

On the contrary, if the failure mechanism is completely unknown, a method of automatically searching for the expression shape itself by genetic programming (GP) may be adopted. However, since the computational load increases when adopting the genetic programming GP, it is necessary to fully consider the calculation resources that can be secured in regard to its adoption.

Regardless of which method is used, the damage model generation/update unit 7 repeatedly updates the damage model and evaluates the variation V, and finally makes a convergence judgment, so that it is possible to define a failure rate function by which a smaller variation coefficient is obtained. In the process of updating the damage model that can minimize the variation V, only the variation coefficient is used as the objective function. Therefore, in this process, only the small variation coefficient may be prioritized, and a fitting degree (likelihood) to the probability density function may become small. In order to avoid this, a constant value is set for the log-likelihood sum calculated by MLE, and it is used as a constraint condition in updating the damage model, or both the variation coefficient and the log-likelihood sum are used as the objective functions for a multi-objective optimization, so that the problem may be solved.

Regarding the damage model D(x) in the damage model generation/update unit 7 described above, Expression (5) is specifically illustrated by taking a wind power generator 1 as an example.

[Math. 5]

$$D(x)=\int(c1+c2\times\text{AVERAGE TEMPERATURE}+c3\times\text{MAXIMUM WIND SPEED}+c4\times\text{AVERAGE WIND SPEED}+c5\times\text{POWER GENERATION AMOUNT})dt \quad (5)$$

In the damage model D(x) illustrated in this equation, a coefficient vector c (c1, c2, c3, c4, and c5) representing the weighting of each time-series operation data D2 is multiplied to the average temperature, the maximum wind speed, the average wind speed, and the power generation amount adopted as the plurality of time-series operation data D2 and integrated. Further, what is adopted as the time-series operation data D2 is appropriately preset, the time-series operation data D2 from the wind power generator 1 is applied, and the optimum value of the coefficient vector c (c1, c2, c3, c4, and c5) is calculated by convergence calculation.

The damage model generation/update unit 7 sequentially provides a new set of survival analysis data D3 to the failure rate function identification unit 8 by calculation using the damage model (x).

Figure 7:
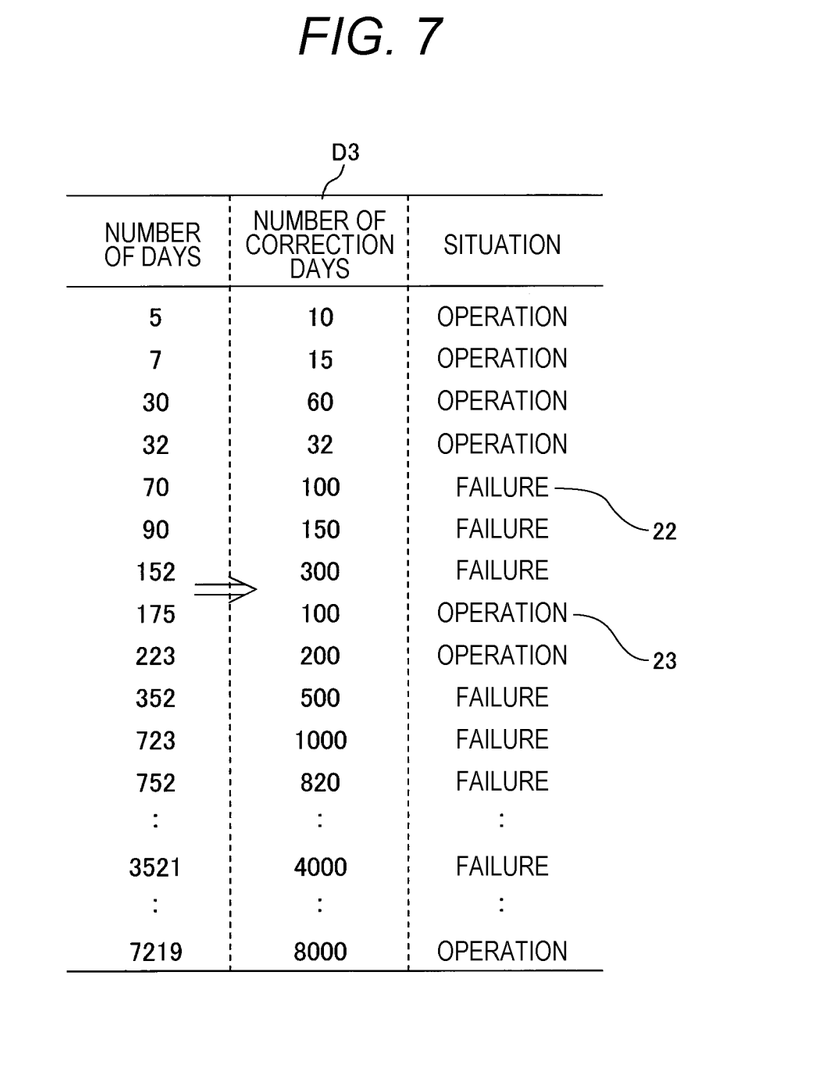
FIG. 7 is a diagram illustrating an example of a new set of survival analysis data D3 provided by the damage model generation/update unit 7.

FIG. 7 is a diagram illustrating an example of a new set of survival analysis data D3 provided by the damage model generation/update unit 7. The survival analysis data D3 illustrated in FIG. 5 is provided to the failure rate function identification unit 8 as the number of correction days with new weighting (coefficient vector c) by updating the damage model D(x). By updating this weighting, the survival analysis data D3 from the wind power generator 1 under severe operating conditions is corrected to increase the number of days, and conversely, the Survival analysis data D3 from the wind power generator 1 under not severe but moderate operating conditions is corrected to reduce the number of days. This means that the variation V illustrated in FIG. 6 has become small, and that the failure rate function 11 has been corrected to 11A.

In executing the damage model D(x) of Expression (5), the initial value of the coefficient vector c (c1, c2, c3, c4, and c5) representing the weighting of each time-series operation data D2 is appropriately determined by a random number. The number of correction days when the coefficient vector c (c1, c2, c3, c4, and c5) of the initial value by a random number is given by the damage model generation/update unit 7 is provided to the failure rate function identification unit 8 as the survival analysis data D3. The failure rate function identification unit 8 obtains the variation V at the time of the initial value by a random number and sends the variation to the damage model generation/update unit 7 again. By repeating this, the respective values c1, c2, c3, c4, and c5 of the coefficient vector c that minimizes the variation V are finally determined.

It can be said that the above-described processing in the damage model generation/update unit 7 automatically generates an explanatory variable expression of the failure rate function f that minimizes the variation in life defined by the failure rate function f. Here, the explanatory variable expression is a monomial expression or a polynomial expression configured by using a part or all of the time-series operation data D2 stored in the time-series operation database DB2, and this example is illustrated in the expression (5). The explanatory variable expression can be said to be an expression representing the relationship between the number of days and the number of correction days in FIG. 7.

When respective values c1, c2, c3, c4, and c5 of the coefficient vector c are finally determined, the damage model D(x) in Expression (5) is completed, and provided from the damage model generation/update unit 7 to the operating condition prediction unit 12. At this time, in the failure rate function identification unit 8, the failure rate f (failure rate function 11) that minimizes the variation V is completed and provided to the failure probability calculation unit 14.

Next, the failure probability calculation unit 14 will be described. The failure rate function 11 obtained up to this point is a function representing the number of failures per unit damage at the time when any cumulative damage is accumulated. Therefore, the failure probability calculation unit 14 integrates this function to calculate a failure probability function 21 that represents the probability of failure (failure probability F) by the time when any cumulative damage is applied. As described in FIG. 6, the probability function 21 is a cumulative distribution function of the identified failure rate function 11, and thus is a monotonically increasing function.

Next, the failure probability Fn at the present time and the failure probability Ft after an arbitrary time has elapsed are calculated based on the obtained failure probability function 21 and the cumulative damage 33 at the present time for each individual.

Specifically, regarding the failure probability Fn at the present moment, the cumulative damage 33 at the present time of each individual calculated based on the damage model D(x) finally adopted by the damage model generation/update unit 7 is substituted to the failure probability function 21, so that the failure probability Fn at the present time can be calculated.

The failure probability Ft after an arbitrary time has elapsed can be obtained as follows. Here, assuming that the present time is to and the arbitrary time is $\Delta t$, a cumulative damage amount 13 until after the arbitrary time elapses is estimated in advance by the operating condition prediction unit 12.

The invention does not impose any limitation on the specific prediction method, but at least it is necessary to individually predict each individual. Specifically, the estimated value of the time-series operation data D2 for each individual until an arbitrary time has elapsed is acquired by some method. The simplest method is to make an assumption that the average value of the time-series operation data D2 recorded up to the present time will continue in the future, which is equivalent to simply extrapolating the trend of cumulative damage amount up to the present time.

When using operating data with seasonal dependence such as wind conditions and temperature, it is desirable to estimate by referring to seasonal trends and forecasts by weather forecasting organizations. Alternatively, it is possible to assume some future operation scenarios, and arbitrarily generate the time-series operation data D2 for each of the scenarios.

Substituting the estimated value of the estimated or generated time-series operation data D2 into the damage model D(x) defined by the damage model generation/update unit 7, $D(t_0+\Delta t)$ as the future cumulative damage 13 can be calculated. Based on this and the cumulative damage $X(D(t_0))$ at the present time, the probability P that the individual operating at the present time fails before the elapse of an arbitrary time ($\Delta t$) can be calculated as a conditional probability according to Expression (6).

[Math. 6]

$$P(t_0, t_0+\Delta t) = \{F(D(t_0+\Delta t)) - F(D(t_0))\} / \{1 - F(D(t_0))\} \qquad (6)$$

Here, F(D) is a failure probability function with the cumulative damage defined by the failure rate function identification unit 8 as an explanatory variable. The failure probability F is an expected value of the number of failure event occurrences until an arbitrary time ($\Delta t$) elapses. This value becomes large if $\Delta t$ is taken long, but normally it is desirable to set $\Delta t$ in consideration of the periodic inspection interval of the mechanical system. Within such a setting range of $\Delta t$, it is unlikely that the failure probability F of each individual becomes a value close to 1.0. However, it is possible that the total value of failure probabilities F for all individuals exceeds 1.0. This total value is an expected value of the number of failure event occurrences in the entire target individuals.

Therefore, by reflecting the total value of the failure probabilities in the component inventory management system 17, it becomes possible to optimize the stock status of replacement components.

Alternatively, when the operation planning system 18 is connected to the wind power generator system, a method of changing the operation plan using the failure probability F may be adopted. For example, if the failure probability F up to scheduled periodic inspection is higher than expected, it is possible to change the operation plan to actively stop the wind power generator 1 or suppress the output to prolong the life of components. Due to this change in the operation plan, the future operation status also changes, and inevitably the future cumulative damage also changes. Therefore, when this method is adopted, it is desirable to reflect an operation plan 19 in calculation of the future cumulative damage 13 in the operating condition prediction unit 12. With such a configuration, the user can easily confirm the relationship between the change in the operation plan and the change in the failure probability.

The damage model generation/update unit 7, the failure rate function identification unit 8, the operating condition prediction unit 12, and the failure probability calculation unit 14 described above are each mounted as a computer program, but are not limited to a mounting type to a specific computer. However, since the damage model generation/update unit 7 needs to perform a calculation process with a relatively high calculation cost while repeatedly calling the failure rate function identification unit 8, it is ideal to mount both units on the same computer.

Finally, an example of the display unit 16 will be described. The display unit 16 is specifically configured by a computer on which a screen drawing program is installed, and a display device. The computer used here may be different from the functions (7, 8, 12, and 14) of the calculation unit 101 described above.

Figure 8:
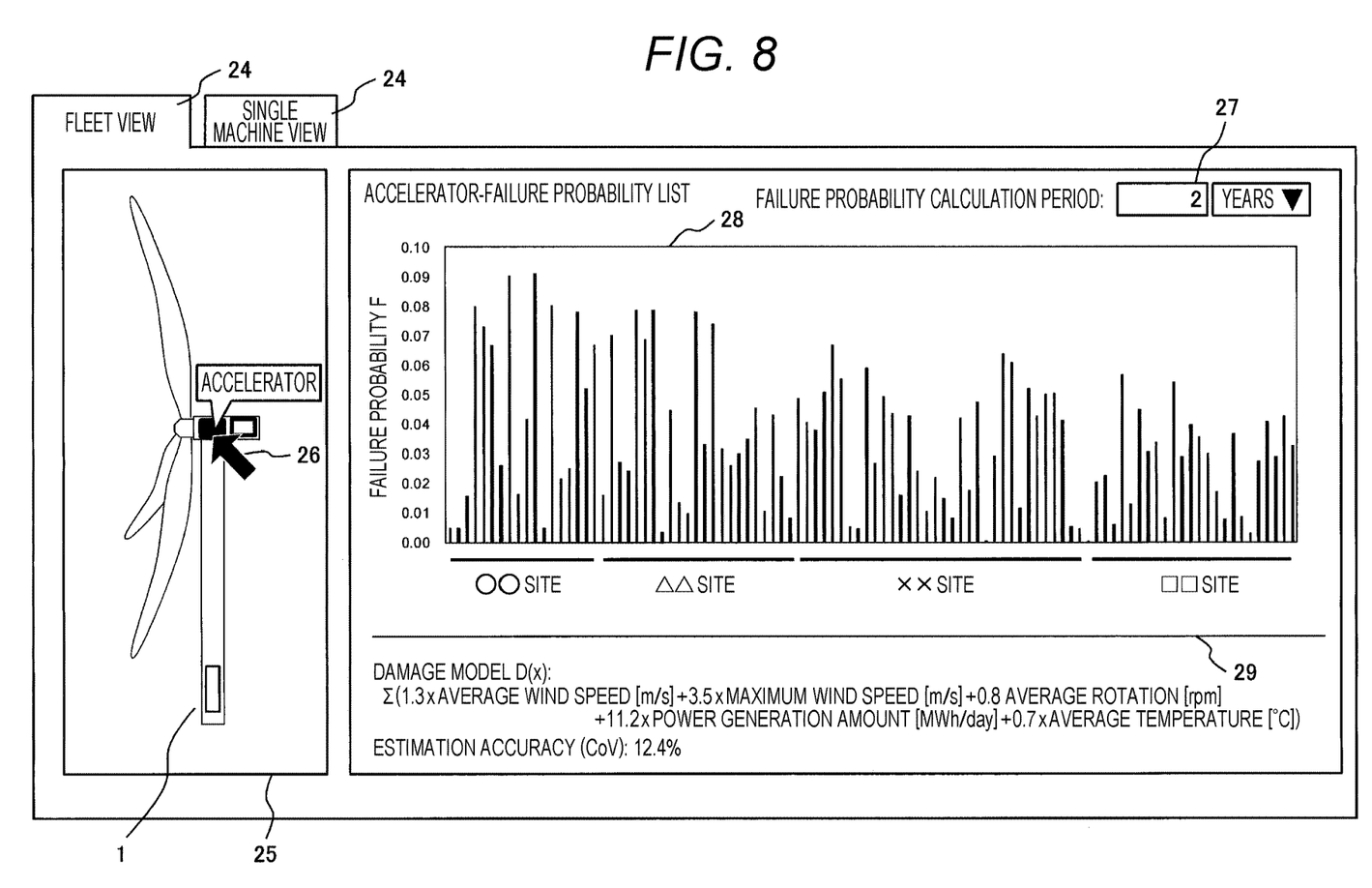
FIG. 8 is a diagram illustrating an example of a fleet view for a wind power generator group.
Figure 9:
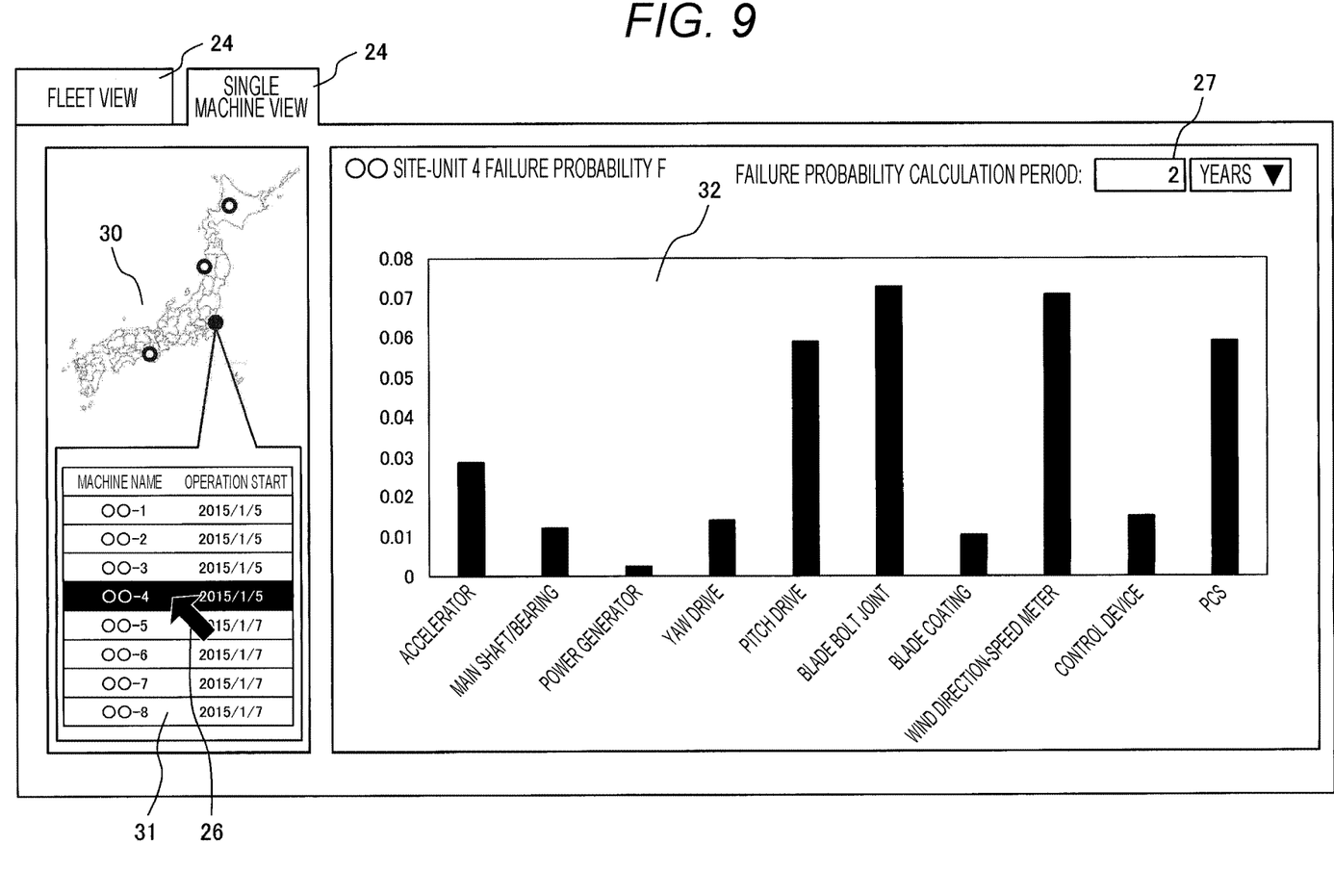
FIG. 9 is a diagram illustrating an example of a single machine view for an arbitrary wind power generator 1.

FIGS. 8 and 9 illustrate examples of a graphical user interface (GUI) suitable for the display unit 16. The GUI is roughly divided into a fleet view (FIG. 8) that targets the wind power generator group and a single machine view (FIG. 9) that targets the arbitrary wind power generator 1.

First, in the fleet view of FIG. 8, a component selection unit 25 displaying the schematic diagram of the wind power generator 1 is provided, and the user selects an arbitrary component 26 from the schematic diagram. Further, when a failure probability calculation period setting unit 27 arbitrarily sets a period for calculating the failure probability, the failure probability F of each machine of the component 26 at present and after an arbitrary period is displayed as a graph on the fleet failure probability display unit 28. As a result, it is possible to easily confirm an individual where a risk of failure of the component 26 of interest to the user increases. At the same time, the expression of the damage model D(x) generated/updated in the damage model generation/update unit 7 is displayed in a damage model display unit 29, so that the user may easily check what factor is the cause of failure of the component 26. This brings useful information not only to the maintenance and operation of the wind power plant but also to the design and development of the wind power generator 1.

Next, in the single machine view of FIG. 9, when an arbitrary wind power generator 1 is selected from a map 30 illustrating the installation location of the wind power generator or the wind power generator list 31, the failure probability F after the present and arbitrary period is displayed as a graph 32 with respect to a component for evaluation. This can be expected to have the effect of easily confirming a component with a high risk of failure in the target machine.

The fleet view and the single machine view can be easily switched by switching the tab 24. In addition, by directly clicking or tapping the bar of the graph in the fleet failure probability display unit 28 or the single unit failure probability display unit 32, it is possible to easily switch between the single machine view of arbitrary wind power generator and the fleet view of arbitrary component.

Further, the invention is not limited to a platform of the program where the GUI is mounted is, but it is desirable to mount as a web application that operates in a web browser, and install in the same computer as each unit (7, 8, 12, and 14) of the calculation unit 101 described above. If it is possible to connect from a computer terminal (user terminal) used by the user via a communication system such as a network, the computing capacity and prerequisite software required for the user terminal may be minimal. Such a configuration is particularly effective when a plurality of users access this system at the same time.

As described above, the failure probability evaluation system according to the invention is configured to include a failure history database in which the past failure history data of the mechanical system is accumulated, a time-series operation database which stores time-series physical quantity data representing the operation state of the mechanical system, a failure rate function identification unit which calculates a failure rate function of the mechanical system by statistical processing based on failure history data or a cumulative failure probability function represented by its integral, and a damage model generation/update unit which has a function of automatically generating an explanatory variable expression of the failure rate function in which the variation in life defined by the failure rate function is minimized.

Second Embodiment

An embodiment of the invention will be described by taking as an example a failure probability evaluation system for components of a construction machine.

Here, although a plurality of construction machines are targeted, the operation place thereof is not limited, and each construction machine may be installed in a different place.

Even a system for a construction machine is not so different from the system for a wind power generator described in the first embodiment.

However, in construction machinery, in addition to simple time-series data, operation data representing what kind of operation has been performed is also useful information. The operation data is, for example, data indicating how many times a predetermined operation is performed in a unit time. For example, in the case of a mining dump truck, the operation data corresponds to the number of times the payload has been loaded and unloaded within a day.

When the target component is, for example, a welded part, a fatigue load is applied by the loading/unloading operation, so it is effective to use such operation frequency data as the time-series operation data D2. Such data based on the number of times is effective for a mechanical system that repeats a predetermined operation other than construction machinery. For example, the number of times a railway vehicle repeatedly travels in the same section and the number of times home appliances are used may be mentioned. As described above, the system according to the invention can evaluate the failure probability corresponding to various mechanical systems depending on how to select the time-series operation data D2.

REFERENCE SIGNS LIST 1 wind power generator
7 damage model generation/update unit
8 failure rate function identification unit
11 failure rate function
12 operating condition prediction unit
13 future cumulative damage
14 failure probability calculation unit
16 display unit
17 component inventory management system
18 operation planning system
19 operation plan
22 failure flag
23 survival flag
24 tab
25 component selection unit
6 pointer
27 failure probability calculation period setting unit
28 fleet failure probability display unit
29 damage model display unit
30 site selection unit
31 individual selection unit
32 single unit failure probability display unit
33 cumulative damage at the present time
D1 failure event data
D2 time-series operation data
D3 survival analysis data
D31 failure data
D32 survival data
DB1 failure event database
DB2 time-series operation database
F failure probability
M worker in charge of maintenance
V variation

The invention claimed is:

1. A failure probability evaluation system for evaluating a failure of a component of each wind power generator for a wind power generator group including a plurality of wind power generators, the failure probability evaluation system comprising:

a failure history database for accumulating past failure history data about the wind power generator;

a time-series operation database for storing time-series operation data representing an operating state of the wind power generator;

a processor coupled to the failure history database and the time-series operation database;

a display coupled to the processor; and a memory coupled to the processor, the memory storing instructions that when executed by the processor, configure the processor to:

calculate a failure probability density function of the wind power generator by statistical processing based on the failure history data, generate an explanatory variable expression of a failure probability density function which minimizes a variation in life defined by the calculated failure probability density function using the time-series operation data, calculate a failure probability based on the calculated failure probability density function and based on a cumulative damage of a component of the wind power generator calculated based on the explanatory variable expression at present and/or after an arbitrary time has elapsed, determine whether the calculated failure probability is greater than a predetermined value, and upon determining the calculated failure probability is greater than the predetermined value, change an operation of plan of operating the wind power generator to actively stop the wind power generator or suppress the output thereof, display simultaneously, on the display, a graphical user interface (GUI) including a screen showing a schematic diagram of a wind power generator, a failure probability graph of a component of the wind power generator, an area to set a failure probability calculation period, and the explanatory variable expression of the failure probability density function, receive, as an input via the GUI, a failure probability calculation period and a selection of a component of the wind power generator, and display, on the GUI, the selected component highlighted within the schematic diagram of the wind power generator, and the graph of the failure probability of the selected component at present and after the arbitrary period for each of two or more of the plurality of wind generators having the selected component at respective sites of the two or more of the plurality of wind generators.

2. The failure probability evaluation system according to claim 1, wherein the explanatory variable expression is a monomial expression or a polynomial expression configured by using the time-series operation data stored in the time-series operation database.

3. The failure probability evaluation system according to claim 2, wherein the explanatory variable expression is an arbitrarily set monomial expression or polynomial expression, and the explanatory variable expression of the failure probability density function is generated by optimization calculation such that a coefficient included in the monomial expression or polynomial expression is determined to be minimized.

4. The failure probability evaluation system according to claim 2, wherein the processor is configured to determine the explanatory variable expression by genetic programming.

5. The failure probability evaluation system according to claim 2,
wherein the processor is configured to obtain a failure probability from the failure probability density function that minimizes the variation in life.

6. The failure probability evaluation system according to claim 1,
wherein the explanatory variable expression is an arbitrarily set monomial expression or polynomial expression, and the explanatory variable expression of the failure probability density function is generated by optimization calculation such that a coefficient included in the monomial expression or polynomial expression is determined to be minimized.

7. The failure probability evaluation system according to claim 6,
wherein the processor is configured to determine the explanatory variable expression by genetic programming.

8. The failure probability evaluation system according to claim 1,
wherein the processor is configured to determine the explanatory variable expression by genetic programming.

9. The failure probability evaluation system according to claim 1,
wherein the processor is configured to obtain a failure probability from the failure probability density function that minimizes the variation in life.

10. The failure probability evaluation system according to claim 1,
wherein the variation is a variation coefficient of the failure probability density function.

11. The failure probability evaluation system according to claim 1,
wherein the processor is configured to identify a failure probability density function by maximizing a log-likelihood based on a maximum likelihood estimation method.

12. The failure probability evaluation system according to claim 1,
wherein the processor is configured to add a log-likelihood to a constraint condition in optimization calculation or genetic programming.

13. The failure probability evaluation system according to claim 1,
wherein the processor is configured to perform a multi-objective optimization calculation in which a log-likelihood is used as an objective function in addition to a variation in genetic programming.

14. The failure probability evaluation system according to claim 1,
wherein the time-series operation data includes a degree of fatigue damage based on a linear cumulative damage rule.

15. The failure probability evaluation system according to claim 1,
wherein the time-series operation data includes temperature, and the explanatory variable expression includes an Arrhenius expression.

16. A failure probability evaluation method for evaluating a failure of a component of each wind power generator for a wind power generator group including a plurality of wind power generators, comprising:
calculating a failure probability density function of the wind power generator by statistical processing based on past failure history data for the wind power generator;
generating an explanatory variable expression of a failure probability density function that minimizes a variation in life defined by the calculated failure probability density function using time-series physical quantity data representing an operating state of the wind power generator;
calculating a failure probability based on the calculated failure probability density function and based on a cumulative damage of a component of the wind power generator calculated based on the explanatory variable expression at present and/or after an arbitrary time has elapsed;
determining whether the calculated failure probability is greater than a predetermined value, and upon determining the calculated failure probability is greater than the predetermined value, change an operation of plan of operating the wind power generator to actively stop the wind power generator or suppress the output thereof;
display simultaneously, on the display, a graphical user interface (GUI) including a screen showing a schematic diagram of a wind power generator, a failure probability graph of a component of the wind power generator, an area to set a failure probability calculation period, and the explanatory variable expression of the failure probability density function;
receiving as an input, via the GUI, a failure probability calculation period and a selection of a component of the wind power generator; and
displaying, on the GUI, the selected component highlighted within the schematic diagram of the wind power generator, and the graph of the failure probability of the selected component at present and after the arbitrary period for each of two or more of the plurality of wind generators having the selected component at respective sites of the two or more of the plurality of wind generators.

17. The failure probability evaluation method according to claim 16,
wherein a failure probability is obtained from a failure probability density function that minimizes a variation in life.

* * * * *